Patented Jan. 29, 1946

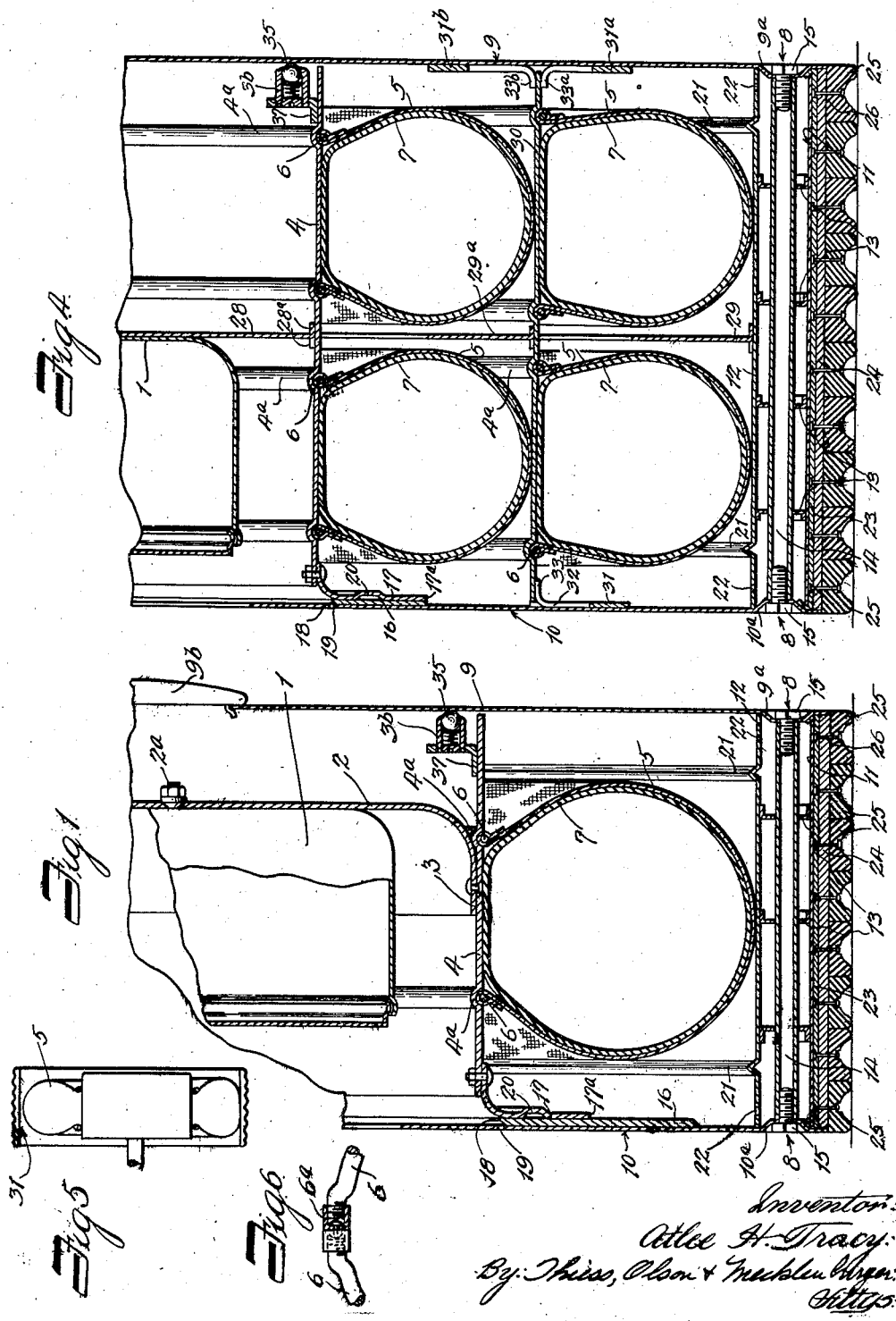

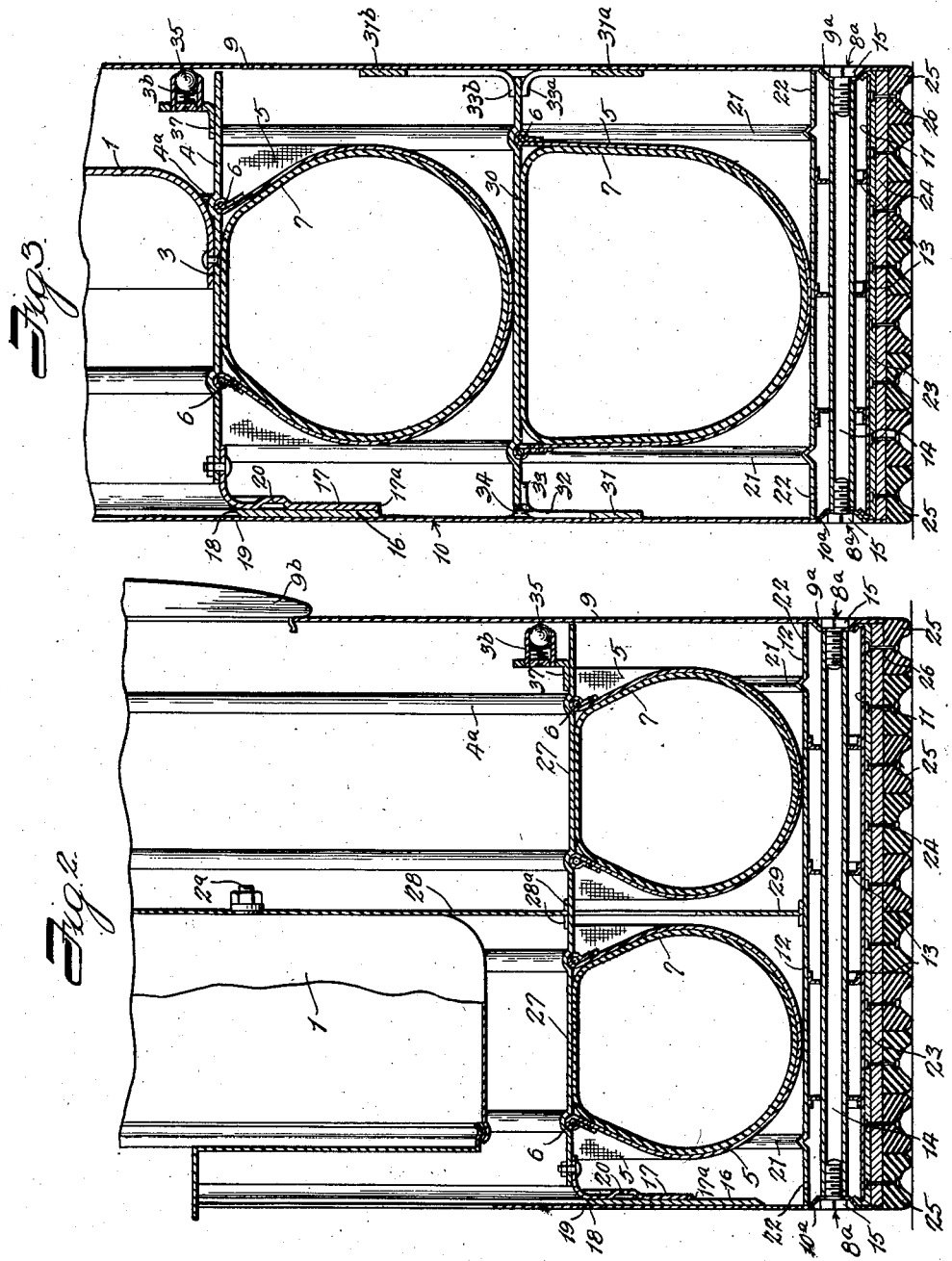

2,393,721

UNITED STATES PATENT OFFICE 2,393,721

RESILIENT VEHICLE WHEEL

Atlee H. Tracy, Sarasota, Fla.

Application November 23, 1942, Serial No. 466,545

20 Claims. (Cl. 305—7)

This invention relates to resilient vehicle wheel structures and is adapted for use in connection with wheels used on automobiles, trucks, airplane landing gear and the like, and the invention is also suitable for heavy bombing planes and gun carriages.

It is an object of the invention to provide a resilient wheel provided with a puncture-proof tread and having one or more inflated tubes so arranged within a wheel casing as to be adequately protected against puncture, dirt and water, and at the same time, providing substantially unrestricted cushioning action to absorb road shocks.

The improved wheel includes an outer puncture-proof rim having a suitable tread surface and forming a part of a drum-like enclosure for the pneumatic tube or tubes enclosed therein.

In the present invention, the pneumatic tubes are secured to an inner rim, which, in turn, is rigidly mounted on the wheel disc and fixed to the hub of the wheel and may be attached to any suitable part, such as the usual brake drum. The inner wheel including the pneumatic tube or tubes is free to roll within the outer rim to which the tread surface may be secured. By this construction, the angular speed of the inner wheel and pneumatic tube thereon may be somewhat greater than the angular speed of the rigid tread.

Other objects and advantages will be hereinafter more fully described, and for a complete understanding of the nature, scope and characteristics of the invention, reference may now be had to the following description and accompanying drawings in which latter:

Fig. 1 is a view of the lower half of a vertical section of one embodiment of the invention including a single pneumatic tube and is adapted for use on automobiles or other comparatively light vehicles, including smaller types of trucks and airplanes.

Fig. 2 is a sectional view similar to Fig. 1, but illustrates a construction including two pneumatic tubes in side-by-side position for heavier duty applications.

Fig. 3 is a similar sectional view of another embodiment and illustrates the use of a plurality of coplanar pneumatic tubes one within the inner periphery of the other for use where greater vertical flexibility is desired than in the usual situation.

Fig. 4 is a sectional view similar to Fig. 3, but illustrates the use of two sets of such coplanar pneumatic tubes in side-by-side relationship for use where both heavy duty and vertical flexibility are desired.

Fig. 5 is a cross-sectional diagrammatical view showing the relative position of the rim, tire and rigid tread ring when the wheel is carrying a load.

Fig. 6 is a detail view of the coupling at the ends of the tire casing-holding ring.

Referring to these drawings in detail, the embodiment shown in Fig. 1 comprises a wheel hub structure which may include the usual brake drum and housing 1, to which latter may be secured in the usual manner, as by bolts, a wheel disc 2 having an inturned annular flange 3. In fact, the same or similar circular series of bolts as are now used to secure the wheel to the hub structure, indicated by bolt 2a, may be used for this wheel disc 2. A cylindrical rim 4 is secured to the flange 3, as by rivets as illustrated, or it may be welded, or otherwise secured. A flexible tire cover 5 is secured by rings 6 to the rim 4. The rings 6 are snugly supported on the rim 4.

While for certain phases of the invention, the ordinary tire casing rim and attaching means may be used, I prefer that this inner tube casing 5 consist of one or more layers of heavy canvas which is not impregnated with rubber, but which should be treated to prevent rot from moisture. Since the space in which the inner tube and its surrounding casing operates is entirely closed, as will hereinafter appear, against dirt and water, there is very little chance for rapid deterioration of the casing but changes of temperature can cause slight amounts of moisture, and mainly for this reason, it would be desirable to waterproof the casing. A single heavy layer of heavy cotton duck would be amply strong to withstand the air pressure now used in inner tubes, but it would be desirable to use more than one layer as an added factor of safety. However, a large number of layers might be detrimental as tending to prevent radiation of heat and would be unnecessary from a mechanical strength standpoint.

To hold the inner tube casing 5 on the rim, the edges are turned back and sewed to the body of the casing to form a pocket along each edge. The ring 6, which may be solid or in the form of a stranded cable, is cut at one point as shown in Fig. 6, and the threaded ends provided with a suitable coupling to secure said ends together. With this arrangement, the rings 6 may be threaded into the pockets through a slit in the hem or pocket at any desired point, and when the two ends are brought together, they may be fastened by the coupling. This coupling may be that shown in Fig. 6 wherein the bottoms of the cup or sleeve members 6a are rotatably secured together, so that by bringing the two ends of rod respectively to the sleeves and turning the latter, the ring 6 is drawn tightly into position on the rim.

The rings 6 may be prevented from working outside their intended positions on the rim by locating them in semi-circular grooves or depressions 4a, formed in any desired way as by rolling, in the rim 4 at the desired places to accommodate the rings 6. When so tightened in place, the edges of the tube casing 5 will be firmly secured to the rim 4.

A pneumatic tube 7 is mounted in the cover 5 and may be inflated to any desired pressure in the usual manner. The tube 7 may be similar to the usual automobile tire inner tube. It is slightly smaller for the same size wheel and may have even thinner walls since it is practically puncture-proof.

The structure just described is enclosed in a drum-like casing including a tread ring assembly portion 8 to which are secured sheet metal side covers or members in the form of an annular plate 9 having a central opening for access to the wheel securing bolts 2a and a removable cap 9b, like a hub cap, to close said opening normally. Said plate 9 is secured to the outer edge of the ring assembly 8. An annular plate 10 is secured near its outer periphery to the inner edge of the ring assembly 8.

The tread ring assembly 8 comprises a pair of concentric cylindrical steel rings 11 and 12, which rings are secured together by means of spacers 13 in the form of flanged sheet metal rings extending around the tread assembly ring 8, and preferably welded at the flanged edges to the rings 11 and 12. Tubular connectors 14 internally threaded at the ends are passed through the spacers 13, and the cover or side plates 9 and 10 are rigidly clamped to the tread assembly by means of machine screws 15 threaded into the ends of the connectors 14. The cover or side plates 9 and 10 are depressed at 9a and 10a, respectively, so that the ends of the screws 15 may be flush with the outer surface of the wheel.

There are six, eight, or more of these tubular connectors 14 spaced equally in the tread ring. They are hollow and may be used to receive exact balancing weights for the wheel, if so desired.

The tread assembly and side members 9 and 10 thus described, form a drum-like enclosure or casing for the pneumatic tube or tubes. This must, of course, be kept in proper position on the rim and tube or tubes. For this purpose, an annular plate 16 is secured, as by welding, to the inner surface of the side plate 10 and the adjacent edge of the tire rim 4 is provided with an outwardly extending flange 17 which is in sliding contact with the plate 16. This flange 17 is an annular stamping separate from the rim 4 for ease and cheapness of manufacture and convenience in assembling or disassembling for any purpose and is bolted in position on the rim, as shown.

The flange 17 is formed with an annular rib 20, which provides a grease pocket for lubricating the contacting surfaces of the plate 16 and flange 17. This grease pocket preferably contains a felt or other filling which is saturated with the grease.

In order that this flange 17 may be kept pressed up against the side plate 10 with a resilient pressure, the opposite edge of the rim is provided at intervals, preferably 60° apart, with outwardly spring-pressed balls 35, as in ball castors, pressing against the inside of the other side plate 9 and therefore keeping the flange 17 up against the opposite plate 10, or rather the plate 16 secured to plate 10.

This castor construction and arrangement may be anything suitable or desired, but at present it is preferred that it comprise a ball 35 projecting from the end of a retaining tube 3b with a suitable washer and coiled spring in the tube bearing against the ball, the tube being screwed into a bracket 37 secured as by bolting or otherwise to the edge of the rim 4. A disc or washer screwed into the tube 3b confines and backs up the coiled spring, and a washer stem prevents excessive movement of the ball.

In this way, the drum-like enclosure of the flexible tire or tires is kept in proper position on said tire or tires and on the rim and wheel structure as a whole. The tread ring assembly should not depart by any detrimental amount from its normal position, in which normal position that part of the outer contact surface of the ring assembly, which is in contact with the road surface, is substantially parallel to the axle of the wheel.

In addition the flange 17 and plate 16, with the grease channel therebetween, form a moisture and dirt-proof connection, so that moisture and dirt entering the drum-like casing through the open center of plate 10 cannot get into the flexible tire chamber or channel, and said tires are protected therefrom. The plate 9 and its hub cap 9b entirely close this side of the drum-like tread casing of the wheel, so that dirt and moisture cannot get into the wheel from its outer side. The ball castors provide sufficient bearing between the rim and plate 9 on this side, and the flexible tire casings are still protected from moisture and dirt.

The flange 17 performs an additional function in tending to prevent crushing of the inner tube and its casing and the entire collapse of the tread casing and wheel in case of the deflation of the tire or in experiencing heavy bumps. For this, the edge 17a of the sliding flange 17 extends outwardly to such an extent that when for any reason the tread ring approaches the flexible tire rim sufficiently, said edge 17a will engage the ring 12 of the tread and prevent the further approach. Thus, the flexible tire and tube are protected from crushing and the wheel from collapsing.

The plate 16 attached to the inside of plate 10 is provided with an angular or chamfered inner edge 18 and the cover plate 10 is provided with drainage holes 19 closely adjacent this chamfered surface, so as to drain any moisture from within the central part of the casing.

This cylindrical tread ring member 12 may also be provided with annular ribs 21 and drainage holes 22 between these ribs and the adjacent casing wall. These will prevent grease which may escape from the pocket 20, or otherwise, from reaching the tread surface of the tire cover 5 and the cooperating inside surface of the tread ring 12. This excess grease is thrown out by centrifugal force through the holes 22 into the space between the inner and outer tread rings 11 and 12. There are, of course, as many of these holes 22 as desired. The grease can be cleaned out of the tread ring by taking off one or both of the plates 9 and 10, as occasion requires.

The material constituting the tread on the tread ring is as follows: an inner layer 23, consisting of three or four layers of heavy cotton cloth, is overlaid by a layer of rubber belting 24. This, in turn, is overlaid by several strips of solid rubber 25 which form the actual road contact surface. Rivets 26 through each rubber strip at several points around the ring and through the belting and cotton layers, with their washers, bind these layers together and into a circular member which can be slipped over the outer surface of the solid tread ring 11 and secured in position thereon. As indicated, the layer of cotton cloth 23 is slightly wider than the metallic tread ring 11 and is folded inwardly thereover as shown, and is securely fastened all the way around the tread ring between the end plates 9 and 10 and the edges of the tread ring 11 when the bolts 15 are tightened and held by suitable lock washers. The side plates 9 and 10 of the tread ring casing are of sufficient diameter, as shown, to overlap the edges of the belting 24.

The side plate 9 is provided with a central opening of a size permitting ready access to the bolts 2a used to secure the rim plate 2 to the hub or brake drum structure, and a removable cap 9b corresponding to the usual hub cap is secured to plate 9 in any desired way over this opening.

For ready access to the valve stem of the inner tube for inflation purposes, the end of the valve stem, as is usual in trucks, may have a small pipe or tube leading therefrom to another or auxiliary stem, with or without its own valve as desired, located on the plate 2 at a point which is readily accessible when the hub cap 9b is removed. These valve stems are not shown, for the sake of simplicity and clearness in the drawings, but are well known and their location and manner of installation and connection for inflation purposes are well understood.

The manner of assembling and use of the invention are thought to be evident. The completed wheel, with the hub cap 9b off, is slipped on over the brake drum housing of the vehicle, as is customary in mounting wheels, and the bolts or nuts 2a are tightened to secure the wheel in position. The hub cap is then placed in position on the plate 9. If necessary to reinflate the tire, the same may be done through the auxiliary stem by removing the hub cap. If for any reason, it is necessary to get at the stem on the tube or to change the pneumatic tires, the same may be done by removing the wheel casing entirely and also the side plate 9, or both plates 9 and 10 and the flange 17.

The tread ring 12 of the assembly 8 is preferably of an inside diameter substantially the same as the maximum diameter of the flexible tire casing 5, when the tire or vehicle is unloaded, or a little larger. Then, when the tire is compressed, as by a load on the vehicle, the hub is lowered and the flexible tire does not touch the inside of the upper part of the tread ring. This is intended to be shown diagrammatically in Fig. 5 wherein the space 31 at the top between the top of the tire and the inside of the ring 12 is seen to exist. This results in a movement which must be taken into account.

The outer tread assembly is rigid and therefore has a fixed diameter and thus a fixed radius but the radial distance from the center of the axle to the outer circumference of the inner tube casing is continually changing due to the flexibility of the inner tube. With insufficient air pressure and a heavy load, the wheel would revolve "off center," i. e., the axle would not be at the center of the wheel. The present type of wheel operates in exactly the same way (but by an amount which is hardly noticeable) because the tire is slightly flat where it rests on the road. For this reason, the inner tube and all other parts mechanically connected to the axle make a slightly larger number of revolutions than the rigid outer tread assembly. In other words, the entire structure might be termed a wheel within a wheel. The difference in the number of revolutions between the two parts of the wheel is relatively small and depends to some extent on the roughness of the road. On the ordinary concrete highway, the average difference is on the order of about two per cent, i. e., the axle would make 102 revolutions for every 100 revolutions of the rigid outer tread. This is the reason for the use of the sliding plates in the dust ring arrangement and the ball castor 35 on the other edge of the rim. They move relatively very slowly as compared to the wheel itself.

In case it should be said that the flexible tube casing 5 might slide or skid and wear on the inner surface of the tread ring 12, it may be pointed out that the very large area of contact (which is clean and dry), as compared to the contact area of the wheel on the road surface, makes that practically impossible. However, it would be cheap and easy to line the inside surface of the ring 12 with a material having a high coefficient of surface frictional resistance, if thought desirable. The flexible tire casing 5, it should be remembered, does not slide on the inner surface of tread ring 12, but rolls very slowly, as above described.

Fig. 2 illustrates an embodiment which is similar to that just described, with the exception that two pneumatic tubes are used in side-by-side relationship. This is intended mainly for use on trucks with heavy loads. In this construction, the rim 27 is wide enough to accommodate the two tube casings 5.

The rim 27 is secured to the hub or brake drum 1 by a disc or annular plate 28 attached centrally to the drum by the usual bolts 2a, as in Fig. 1. At its periphery, it is connected to the inside of the rim 27 in any desired way, that shown involving radially slitting the edge at suitable intervals and bending the adjacent tongues or portions between slits alternately to one side and to the other to form lateral flanges 28a, which, in turn, are secured to the rim by bolting, riveting or welding.

An annular inwardly extending ring 29 secured in any desired way to the inside of the tread ring 12, extends between the pneumatic tube casings and engages the rim 27 when the tires are deflated. This assists the side flange 17 in providing safety stops to prevent a complete collapse of the wheel or crushing of the tires when the tubes are deflated or heavy bumps are encountered. The tread construction in this embodiment is similar to that shown in Fig. 1, though wider to cover the two tires, and the other features are the same or substantially so, and are not here specifically described. Their construction and operation will be understood.

Fig. 3 is substantially similar to the construction shown in Fig. 1 with the exception that two pneumatic tubes and casings one within the inner periphery of the other are mounted in the same plane. This arrangement is useful particularly on the leading or trailing wheels of the tricycle landing gear of airplanes. Here great vertical flexibility is desired. In this construction, a floating annular rim or ring 30 is positioned between the pneumatic tubes and is arranged for sliding engagement at each edge with the side plates 9 and 10 of the drum casting. This sliding engagement device at the plate 10 or 16, for instance, comprises a ring 31 having at suitable intervals inwardly extending tongues 32, the ends of which are split to permit bending one split end laterally and inwardly of the casing, so that the two ends 33 and 34 form a seat for the edge of the floating rim or ring 30. This ring is not attached to anything, so that it is free to slide in all directions with respect to plate 10 or 16.

At the plate 9, the construction and arrangement is slightly different in that two sliding rings 31a and 31b are provided. Connecting strips between these rings are slit near the edge of rim or ring 30 and their ends bent laterally on both sides of rim or ring 30, as at 33a and 33b. This set of rings and their connecting parts are slidable also in all directions with respect to plate 9.

With this construction and arrangement, it will be seen that with a deflation of the pneumatic tires or when encountering heavy bumps, the tires and casings will be prevented from being crushed by the striking of the flange 17 against the rim or ring 30 or the tongues 34 of the ring 31 on the side plate 10 or 16, and by the engagement of ring 31b against rim 4 on the plate 9 side.

Likewise the floating rim or ring 30 will be prevented from crushing down on the tread rim 12 by the outer edges of sliding rings 31 and 31a striking the inside of the tread ring 12.

Variations in the air pressure between the two tubes or sets of tubes may be used to change the time element for the maximum vertical movement of the rim, and, of course, different sizes and shapes of tires may be used.

Fig 4 illustrates an embodiment which is also similar to that shown in Fig. 3, with the exception that two sets of pneumatic tubes are used in side-by-side relationship, and the proportions of the associated elements are increased to conform with the requirements of this embodiment. This form is adapted for a landing wheel on big airplanes, such as the "flying fortresses." Such planes weigh, roughly, fifty thousand pounds and land at a speed of better than eighty miles per hour, which is about one hundred and twenty feet per second.

As suggested, these wheels are considered particularly useful in airplane landing gears. Such wheels are in actual use, that is, loaded, only a part of the time. The remainder of the time, when the plane is in the air, they are not in actual use—not loaded—and it is desirable that they may be as compact and evenly balanced as possible and without loose parts or complication at such times. The substantial filling of the radial space between the hub tire rims and the treads by the pneumatic tire means, whether single or multiple tires and with or without floating rims, when the wheels are not loaded, causes the off-center parts to assume automatically their concentric positions by reason of the air pressure in the tires tending to restore them to normal unloaded form or cross-section. Then when they are used, the weight or load transferred through the axle to the wheels causes a downward movement of the actual operating centers of the inside portions of the wheels, the rotation thereof at different angular velocities from the tread ring, and the rolling of the ring and center parts on each other. Changing loads due to roughness of the road or otherwise produce almost constant changing ratios of difference in angular velocities in the two positions of the wheel.

The area of rolling contact of the tire means is proportional to the load imposed, as will be seen in Fig. 5, where the flattening of the loaded tire in contact with the tread increases the theoretical line contact of the unloaded condition to a relatively wide band contact. This is of advantage as increasing the resistance to slippage of the pneumatic tires in the treads, and the greater the load the greater the resistance. It is of advantage also where power may be applied to the centers to drive the wheels. The greater lowering of the centers of the wheels with greater loads is also an advantage in such power applications in giving greater leverage for the application of the power when the load increases.

Still another advantage in the centering of the pneumatic tire parts in a tire of this rolling-contact type in airplane use is the prevention thereby of slippage of the pneumatic tires on the treads or other parts engaged in the inside of the wheel when the airplane lands. If the tread were hanging down below the tire parts just before landing, the tread would be turned rapidly before being pressed into engagement with the pneumatic tire parts. This would tend to cause slippage between the outer and inner portions of the wheel and perhaps damage to the tire before the inner parts could be brought up to speed. But with all the parts being centralized together and the coefficient of friction of rest being so much greater than that of movement, the whole wheel would start to rotate together upon first touching the surface in landing and there would be no internal slippage.

The centering of the parts when the wheels are not in use has its advantages even though the wheels are not used eventually for airplanes. In ordinary handling, storage, etc., it is better and more satisfactory to have the parts of the wheel centralized and not loose. It is better when it comes to handling the same for installation and in installing, and likewise in changing or inspecting the same on the road. Spare tires, if carried, are more conveniently handled and better carried if the parts are centralized and there are no loose parts to shake around.

From the foregoing, it is apparent that since the wheel is made almost entirely of pressed or stamped parts, it is even cheaper than the present type including its tire. But what is far more important at this time, is that its use requires vastly less rubber. The inner tube is the same as at present, although it is slightly smaller for the same size of wheel and may possibly even have thinner walls since it is practically punctureproof. The actual tread is preferably of solid rubber and will, of course, wear, but it can be made of a much inferior grade of rubber and there is less of it than there is in the present casing for the same size wheel. The inner tube has such an enormously greater life in both this and the ordinary wheel that it hardly enters the question of rubber supply as a major item. In fact, it would seem that elimination of a spare wheel would be possible and this would at once cut requirements for new equipment by twenty percent. It is estimated that the ton mileage of transportation obtained for each pound of rubber actually worn away in surface contact by the road surface would be at least five times as great as with the present type of pneumatic tire.

It is intended, of course, that the invention should not be limited to the specific embodiments disclosed herein, since modifications may be made, and it is contemplated, therefore, by the appended claims to cover any such modifications as fall within the true spirit and scope of this invention.

Having thus described the invention, what is claimed and desired to be secured by Letters Patent is:

1. A resilient vehicle wheel comprising, in combination, a tread ring, a tire rim therein connected with the hub structure, a pneumatic tire means between the rim and ring anchored throughout its circumference to its mounting, the opposing tread surface therefor being substantially flat transversely, said tire means substantially filling the space circumferentially from the rim to the ring when the wheel is not loaded but radially compressible in the lower part of the wheel and not filling the entire space in the upper part when the wheel is loaded, the rim and ring being constructed and connected to rotate at different angular velocities when the wheel is rolling.

2. A resilient vehicle wheel comprising a ring with a substantially flat inside surface, a rim therein, a pneumatic tire secured circumferentially throughout to the rim and of a size substantially to reach the inside of the ring when the wheel is unloaded but to drop below the upper part thereof when loaded, the ring and tire being constructed and proportioned to have different angular velocities when the wheel is so loaded and moving and the tire to roll on the inside of the ring.

3. A resilient vehicle wheel comprising a relatively rigid tread ring casing with a substantially flat transverse inside tread surface, a rim therein connected with the hub structure of the wheel, a pneumatic tire secured at its circumference throughout to the rim and of a size substantially to reach the inside of the tread ring when the wheel is unloaded but to drop below the upper part thereof when loaded, the tread ring and tire and the rim being constructed and connected to have different angular velocities when the wheel is so loaded and moving and the tire to roll on the inside of the ring.

4. A resilient wheel structure comprising a tire rim, pneumatic tire means circumferentially secured thereto on the rim, a metallic tread ring having a substantially flat transverse inside surface surrounding the tire means and having side members overlapping the rim, the rim and ring being concentric when the wheel is unloaded but eccentric when loaded, the rim and ring being so constructed and connected that when the wheel is so loaded they operate at different angular velocities and the tire rolls on the inside of the ring, the rim having sliding engagement with the inside surface of the adjacent side member, and a dirt- and moisture-proof connection therebetween.

5. A resilient wheel structure comprising a tire rim, pneumatic tire means on the rim, a metallic tread ring or casing surrounding the tire means and having side members overlapping the rim, the rim and being concentric when the wheel is unloaded but eccentric when loaded, the rim and ring when the wheel is so loaded operating at different angular velocities, the rim having movable engagement with the side members, and safety stop members to prevent the rim approaching so closely to the tread member or assembly as to cause damage to the pneumatic tire parts.

6. A resilient wheel comprising a hub structure, a rim carried thereby, pneumatic tire means on the rim, and a rigid tread casing enclosing the tire means and rim and concentric therewith when the wheel is not loaded but eccentric thereto when loaded, said casing having a tread ring assembly and side members extending inwardly and past the said rim, the ring and rim operating at different angular velocities when the wheel is loaded and rolling, the rim having a sliding engagement with the inner face of the inside member of the said casing and a resilient engagement with the inside of the outer side of said casing.

7. A resilient wheel comprising a disc for attaching to the hub structure of a wheel in the usual way, a tire rim on the disc, a rigid drum-like tread casing for the wheel having a tread ring and side members, the inner side member having an enlarged central opening to permit the drum to be slipped over the hub structure, a dirt- and moisture-proof engagement between the rim and the inside surface of said inner member, and pneumatic tire means within the dirt- and moisture-proof channel or trough-like space between the tread ring and side members and the rim automatically to centralize the rim in the ring when the wheel is not loaded and permitting same to become eccentric thereto when the wheel is loaded, the rim and tread operating at different angular velocities when the wheel is so loaded.

8. A resilient vehicle wheel comprising, in combination, a tire rim attached to the hub structure, a tire tread ring surrounding the rim, and pneumatic tires one within the inner periphery of another between the rim and tread, the tires being concentric when the wheel is unloaded and eccentric when loaded and operating at different angular velocities.

9. A resilient wheel comprising a hub structure, a rim on said structure, a pneumatic tire mounted on said rim, a ring mounted in floating relation on said tire and having a different angular velocity and rolling contact therewith, a second pneumatic tire mounted on the outside of said ring, and a second ring in floating relation on said second tire and having a different angular velocity and rolling contact therewith.

10. A resilient wheel comprising a hub structure, a rim on said structure, a pneumatic tire mounted on said rim, a second rim mounted in floating relation on said tire, a second pneumatic tire mounted on said second rim, and a tread ring for the wheel in floating relation on said second tire and having side members extending inwardly and overlapping said tires and rims, said rims, tires and ring being coplanar and arranged to be automatically rendered concentric by the pressure in the tires when the wheel is unloaded, and automatically to be made eccentric and to operate at different angular velocities by and proportional to the load imposed on the wheel.

11. In a resilient wheel, a hub structure, a tire-carrying rim secured thereto, a circular rigid tread casing or assembly trough-like in cross-section around the rim, coplanar pneumatic tires within said tread casing, the inner tire being carried by the rim, and a floating rim between the coplanar tires, the inner tire operating on the inside surface of the floating rim and the outer tire being secured to the outside surface of the floating rim and operating by rolling contact on the inside surface of the tread ring assembly, the two rims and the ring having each a different angular velocity, and the outside of the tread ring assembly having a tread surface for contact with the road.

12. A resilient wheel comprising a hub structure, a rim on said structure, a plurality of pneumatic tires on said rim in side-by-side relation, a rigid cylindrical tread member for said tires mounted in floating relation on said tires and having a different angular velocity and rolling contact therewith, and side members closing the space between said rim and tread member.

13. A resilient wheel comprising a hub structure, a rim on said structure, a plurality of pneumatic tires in side-by-side relation on said rim, a second rim of larger diameter surrounding said tires and having a different angular velocity and rolling contact therewith, a second set of tires mounted on said second rim, and a wheel tread ring of larger diameter surrounding said second tires and having a different angular velocity and rolling contact therewith, and enclosing side members between said tread ring and said first rim.

14. A resilient wheel comprising, in combination, a hub structure, a rim secured thereto, a tread ring surrounding the rim and having side members extending inwardly past the edges of the rim, pneumatic tire means between the rim and ring and communicating motion therebetween, the tire means engaging and causing the rim and tread to be concentric when the wheel is unloaded and permitting them to become eccentric when loaded, said rim and tread being constructed and connected to operate at different angular velocities when loaded and rolling, and means to maintain the plane of the tread ring perpendicular to the axis of the wheel.

15. In a resilient wheel, a hub structure, a rim structure secured thereto, a plurality of pneumatic tires mounted side by side on the rim structure, a tread ring surrounding said tires, the tires having different angular velocities from that of the ring and rolling contact on the inside of the ring, and means preventing the tread ring from departing substantially from its normal position in which that part of the outer contact surface of the ring which is in contact with the road surface is substantially parallel to the axle of the wheel.

16. A resilient wheel comprising a hub structure, a rim on said structure, a pneumatic tire mounted on said rim, a ring surrounding the tire, a second pneumatic tire mounted on said ring, and a second ring surrounding said second tire, said tires engaging their respective rings circumferentially when the wheel is not loaded but dropping below the same at the top when loaded, the engaging tires and rings operating at different angular velocities with rolling contact therebetween when the wheel is rolling.

17. A resilient wheel comprising a hub structure, a rim on said structure, a pneumatic tire mounted on said rim, a ring surrounding the tire, a second pneumatic tire on said ring and concentric to the first-named tire, and a tread ring for the wheel surrounding the second tire, said tires engaging the surrounding rings circumferentially when the wheel is not loaded but dropping below the same at the top when the wheel is loaded, the engaging tires and rings rotating at different angular velocities and with rolling contact therebetween when the wheel is loaded and rolling.

18. A resilient wheel comprising a hub structure, a rim on said structure, a plurality of pneumatic tires on said rim in side-by-side relation, and a rigid ring surrounding said tires, said tires engaging the ring circumferentially all around when the wheel is not loaded but dropping below the same at the top when the wheel is loaded, the tires and ring then rotating at different angular velocities and with rolling contact therebetween when the wheel is rolling.

19. A resilient wheel construction comprising a hub structure, a rim on said structure, a plurality of pneumatic tires in side-by-side relation on said rim, a rigid ring surrounding said tires, a second set of tires mounted on said ring, and a wheel tread ring surrounding said second set of tires, the tires engaging the inside of the rings circumferentially when the wheel is not loaded but dropping free from the same at the top when the wheel is loaded, the engaging tires and rings rotating at different angular velocities and with rolling contact therebetween when the wheel is loaded and rolling.

20. A resilient wheel comprising a tread ring, a tire rim therein connected with the hub structure, a pneumatic tire on the rim and circumferentially anchored thereto at all points in its circumference, the pneumatic tire engaging the inside of the ring and automatically centralizing the ring and rim when the wheel is unloaded, said tire being constructed and related to the parts to enable the tire and rim to be decentralized when loaded and to rotate at different angular velocities and the pneumatic tire to roll on the inside of the ring.

ATLEE H. TRACY.